United States Patent
Petrescu et al.

(10) Patent No.: US 11,416,379 B1
(45) Date of Patent: Aug. 16, 2022

(54) CREATION OF SOFTWARE TESTS MATCHING PRODUCTION PERSONAS

(71) Applicant: Amazon Technologies, Inc., Seattle, WA (US)

(72) Inventors: Mihaela Petrescu, Seattle, WA (US); James Beavis, Seattle, WA (US); Yan Peng, Redmond, WA (US); Adithya Venkatesh, Sydney (AU); Peter Ramensky, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 99 days.

(21) Appl. No.: 16/907,113

(22) Filed: Jun. 19, 2020

(51) Int. Cl.
*G06F 11/36* (2006.01)
*G06F 8/60* (2018.01)

(52) U.S. Cl.
CPC ............ *G06F 11/3684* (2013.01); *G06F 8/60* (2013.01); *G06F 11/3688* (2013.01); *G06F 11/3692* (2013.01)

(58) Field of Classification Search
CPC .... G06F 8/60; G06F 11/3684; G06F 11/3688; G06F 11/3692
See application file for complete search history.

(56) References Cited

U.S. PATENT DOCUMENTS

| | | | |
|---|---|---|---|
| 8,347,267 B2 | 1/2013 | Givoni et al. | |
| 9,229,845 B1 * | 1/2016 | Chandrasekharapuram | G06F 11/3692 |
| 9,514,034 B1 | 12/2016 | Griffin et al. | |
| 9,619,648 B2 * | 4/2017 | Sol | H04L 63/1425 |
| 10,108,535 B2 | 10/2018 | Aggarwal et al. | |
| 10,459,828 B2 | 10/2019 | Seibert, Jr. et al. | |
| 10,509,718 B2 | 12/2019 | Venkatasubramanian et al. | |
| 10,983,901 B1 * | 4/2021 | Pearce | G06F 11/3688 |
| 11,163,669 B1 * | 11/2021 | Torun | G06F 8/65 |
| 2009/0193391 A1 * | 7/2009 | Miller | G06F 11/3672 717/105 |
| 2014/0143283 A1 * | 5/2014 | Sim-Tang | G06F 16/211 707/802 |
| 2015/0254163 A1 * | 9/2015 | Baril | G06F 11/3452 714/38.1 |
| 2017/0366421 A1 * | 12/2017 | Dam | H04L 43/06 |
| 2018/0349254 A1 * | 12/2018 | Hui | G06F 11/3692 |

\* cited by examiner

*Primary Examiner* — Wei Y Zhen
*Assistant Examiner* — Brahim Bourzik
(74) *Attorney, Agent, or Firm* — Robert C. Kowert; Kowert, Hood, Munyon, Rankin & Goetzel, P.C.

(57) ABSTRACT

Methods, systems, and computer-readable media for creation of software tests matching production personas are disclosed. A software testing system determines a plurality of observations regarding execution of a software product in a production environment comprising a plurality of software products. The software testing system determines one or more personas based at least in part on analysis of the plurality of observations. A particular persona represents one or more usage characteristics shared by a subset of clients of the software product. The software testing system generates one or more tests associated with the particular persona. The one or more tests comprise one or more input values of a plurality of calls. The one or more input values represent the usage characteristics shared by the subset of clients of the software product.

20 Claims, 6 Drawing Sheets

CREATION OF SOFTWARE TESTS MATCHING PRODUCTION PERSONAS

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Complex systems may include many services that interact with one another in a variety of ways.

Testing of such services is an increasingly important part of the software development process. A suite of tests may be run to verify the expected operation of software. Types of tests may include unit tests, integration tests, regression tests, load tests, performance tests, and so on. In order to adequately assess the expected operation of a service, tests should represent real-world usage. However, tests must often be generated manually by service developers. The manual creation of tests that adequately mimic real-world usage may be too time-consuming for developers, and the quality of the tests and the resulting analysis may suffer accordingly.

Figure 1:
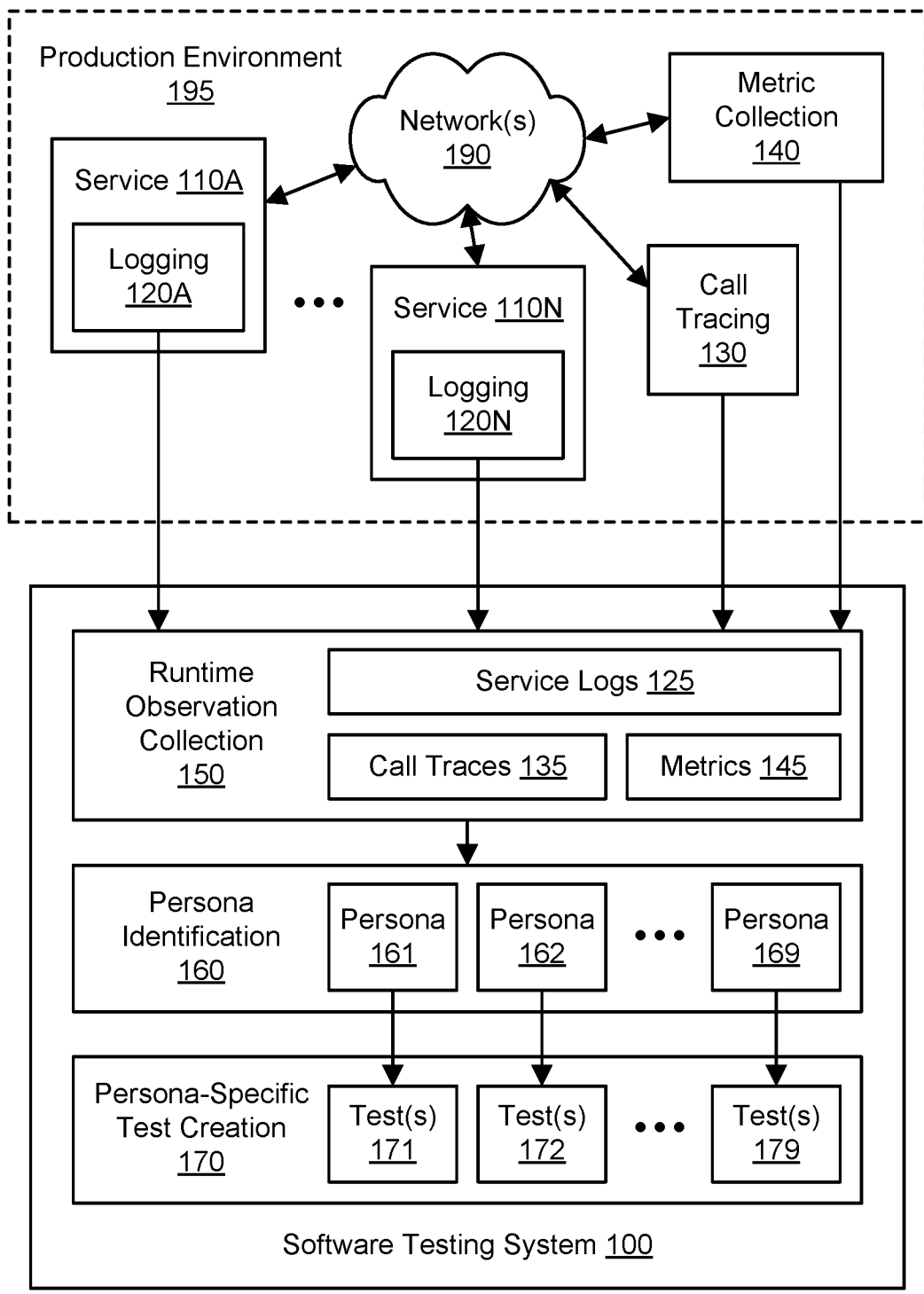
FIG. 1 illustrates an example system environment for creation of software tests matching production personas, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for creation of software tests matching production personas are described. Software products such as services and applications may be deployed to production environments in which they interact with real-world clients. To assess whether the software products are performing according to expectations, developers or service owners may run a variety of tests. Testing a service may include sending service calls to endpoints that host the service. For accurate analysis of service performance, it is desirable for such tests to reflect the real-world traffic and usage patterns encountered in production environments. However, it may be unduly time-consuming for developers to manually create tests that accurately reflect production traffic. As a result, manually generated tests may fail to cover real-world scenarios or may fail to adapt to changing conditions in production environments. Services that are not tested properly may experience failures (e.g., unavailability or high latency) such that the client experience is negatively impacted.

The aforementioned challenges, among others, are addressed by embodiments of the techniques described herein, whereby automated techniques may be used to collect service-related data from production environments, identify personas that represent categories of clients, and generate tests that accurately represent real-world traffic for particular personas. A software product (e.g., a service) may be monitored in a production environment to collect observations such as service logs, metrics, call traces, and so on. A software testing system may automatically collect and analyze these observations to identify one or more client categories termed personas. A persona may represent one or more usage characteristics shared by a subset of clients of the service, e.g., large clients, new clients, clients that are especially susceptible to service outages, clients that use particular service features, clients that have unusual call patterns, and so on. The software testing system may automatically generate one or more tests to represent the one or more personas identified for the service. A persona-specific test may include a set of input values, a call order, a call volume or call throughput, and so on. Input values in persona-specific tests may be cleaned up, e.g., to replace confidential values observed in production traffic with valid non-confidential values. To accurately assess the performance of the service for a particular persona, the persona-specific test(s) may be run against one or more endpoints that host the service, e.g., by sending calls that represent the set of input values, call order, and/or call volume or call throughput of the persona. By automatically generating tests that reflect production personas, the software testing system may improve the quality of testing.

As one skilled in the art will appreciate in light of this disclosure, embodiments may be capable of achieving certain improvements to computer technology, including some or all of the following technical effects: (1) improving the detection of performance problems in software products by generating tests that accurately reflect real-world usage; (2) improving the detection of security flaws in software products by generating tests that accurately reflect real-world usage; (3) improving the availability of computing resources by not requiring developers to engage in time-intensive manual test generation; and so on.

FIG. 1 illustrates an example system environment for creation of software tests matching production personas, according to some embodiments. Software products such as services 110A-110N and applications may be deployed to a production environment 195 in which they interact with real-world clients. A software testing system 100 may collect data from production environments, identify personas that represent categories of clients according to the collected data, and generate tests that accurately represent real-world traffic for particular personas. The collected data may represent observations about the runtime execution or performance of software products such as services 110A-110N. A particular persona may represent a set of usage characteristics that are observed in the runtime data for a subset of clients of a service. In some embodiments, for example, personas identified in the production environment 195 may include a large client persona, a new client persona, an outage-sensitive client persona, a persona for a client that uses a particular feature, a unique or unusual client persona, and so on. Persona-specific tests may be used to assess the functionality of a particular service, application, or other software product deployed to one or more endpoints. To accurately assess the performance of the service for a particular persona, the persona-specific test(s) may be run against one or more endpoints that host the service, e.g., by sending calls that represent the set of input values, call order, and/or call volume or call throughput associated with the persona. By automatically generating tests that reflect usage characteristics of real-world client personas, the software testing system may improve the quality of automated testing of services, applications, and other software products.

The software testing system 100 may include a component 150 for collection of runtime observations about services 110A-110N. For example, the runtime observations may include service logs 125 acquired via logging components of various services, e.g., logging 120A at service 110A and logging 120N at service 110N. Service logs 125 may indicate application programming interfaces (APIs) that were invoked by service calls, parameter values (inputs) of calls, responses (outputs) to calls, failure or success of calls, timestamps of calls, and so on. As another example, the runtime observations may include call traces 135 acquired from a call tracing component 130. To perform call tracing, trace headers may be embedded in service requests, and the flow of a particular trace header from service to service may be used to identify call chains and dependency relationships among services. In some embodiments, call traces may also indicate application programming interfaces (APIs) that were invoked by service calls, parameter values (inputs) of calls, responses (outputs) to calls, failure or success of calls, timestamps of calls, and so on. As yet another example, the runtime observations may include metrics 145 acquired from a metric collection component 140. Metrics may indicate performance values (e.g., average values over intervals of time or threshold violations) observed for processor resources, memory resources, storage resources, network resources, and so on. Runtime observations may be collected once or on a recurring basis, e.g., according to a schedule or frequency specified by service owners. The runtime observations may be collected over a sufficiently long interval of time to identify representative behaviors of clients.

The software testing system 100 may include a component 160 for persona identification. For a given service such as service 110A, the persona identification 160 may analyze the runtime observations (e.g., service logs 125, call traces 135, and/or metrics 145) to identify personas that correspond to distinct categories of clients of that service. For example, the persona identification 160 may identify personas 161 and 162 through 169 for the service 110A. A particular persona may represent a set of usage characteristics or behaviors that are observed in the runtime data for a subset of clients of a service. A subset of clients may include at least one client but not all of the clients. In some embodiments, for example, personas identified in the production environment 195 may include a large client persona, a new client persona, an outage-sensitive client persona, a persona for a client that uses a particular feature, a unique or unusual client persona, and so on. The usage characteristics or behaviors that distinguish one persona from another persona may include a set of APIs that are called, a volume of calls, an order of calls, parameter values (inputs) of calls, outputs of calls, call patterns, how calls are connected, service dependencies corresponding to calls, service metrics corresponding to calls, and so on. Personas may be identified once or on a recurring basis, e.g., according to a schedule or frequency specified by service owners.

In one embodiment, machine learning techniques may be applied to runtime observations to identify usage characteristics that correspond to distinct personas. For example, a neural network may be trained with sets of usage characteristics for known personas in order to identify new personas not found in the training set. Machine learning techniques may be implemented using one or more systems that learn from data, identify patterns, and make predictions or other decisions with minimal human intervention (e.g., after human input during an initial configuration phase such as model training). Machine learning may include generating and using one or more models that can programmatically output results (e.g., indicators of redundant logic) based (at least in part) on input (e.g., the logic itself and/or dependency relationships associated with the logic). Such a model may undergo a training process (e.g., using a training data set) such that it learns patterns sufficient to make inferences about future events.

The software testing system 100 may include a component 170 for persona-specific test creation. For a given persona, the persona-specific test creation 170 may generate one or more tests that seek to mimic the real-world behavior of a subset of clients with respect to a service. For example, one or more persona-specific tests 171 may be generated that correspond to persona 161, one or more persona-specific tests 172 may be generated that correspond to persona 162, one or more persona-specific tests 179 may be generated that correspond to persona 169, and so on. Persona-specific tests 171-179 may be used to assess the functionality of a particular service, application, or other software product deployed to one or more endpoints. A persona-specific test may include a set of input values, a call order, a call volume or call throughput, and so on. Input values in persona-specific tests may be cleaned up by the system 100, e.g., to replace confidential values observed in production traffic with valid and non-confidential values. In some embodiments, a persona-specific test may include a set of expected output values corresponding to particular input values, an expected success or failure of particular input values, an expected latency for one or more calls, and/or other values with which to assess the performance of the service during testing. Persona-specific test creation 170 may include generating new tests and/or updating existing tests.

Components such as services 110A-110N, metric collection 140, and/or call tracing 130 may be implemented using a service-oriented system. The service-oriented system 110 may follow a service-oriented architecture and may include multiple services 110A-110N configured to communicate with each other (e.g., through message passing) to carry out various tasks via one or more networks 190. Although services 110A and 110N are illustrated for purposes of example, it is contemplated that any suitable number and configuration of services may be used with the service-oriented system. One of services 110A-110N may represent an individual service host or a set of service hosts that implement the same service. The services 110A-110N, metric collection 140, and/or call tracing 130 may be implemented using a plurality of hosts, any of which may be implemented by the example computing device 600 illustrated in FIG. 6. The hosts may be located in any suitable number of data centers or geographical locations. In one embodiment, multiple services and/or instances of the same service may be implemented using the same host.

The service-oriented system may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of processes. The services 110A-110N described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

Services 110A-110N may send service requests to other services and receive corresponding responses to those requests. A service may offer one or more application programming interfaces (APIs) or other programmatic interfaces through which another service may request the functionality of the service. In some cases, a first service may call a second service, the second service may call a third service to satisfy the request from the first service, and so on. For example, to build a web page dynamically, numerous services may be invoked in a hierarchical manner to build various components of the web page. A service may include one or more components that may also participate in the service-oriented system, e.g., by passing messages to other services or to other components within the same service. In one embodiment, the software testing system 100 may perform persona-specific testing at the granularity of individual APIs or components of services. In one embodiment, the software testing system 100 may perform persona-specific testing at the granularity of individual services.

In some embodiments, service hosts and other components (e.g., the runtime observation collection 150) may convey network-based service requests via one or more networks 190. In various embodiments, the network(s) 190 may encompass any suitable combination of networking hardware and protocols necessary to establish network-based communications between the client and the system 100. For example, the network(s) 190 may generally encompass the various telecommunications networks and service providers that collectively implement the Internet. The network(s) may also include private networks such as local area networks (LANs) or wide area networks (WANs) as well as public or private wireless networks. For example, one or more of the services 110A-110N and the system 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between one component and the Internet as well as between the Internet and the component. It is noted that in some embodiments, components may communicate using a private network rather than the public Internet.

The production environment 195 may include various modules, components, or functionalities to implement execution of a software product (e.g., service 110A) as the software product interacts with real-world clients. Real-world clients may include external entities (with respect to the production environment 195) and/or other services in a service-oriented system (e.g., in the same production environment), including other services whose functionality is invoked directly or indirectly by external entities. For example, if service 110A provides a portion of a dynamically generated web page, then the service may be invoked by a request from a page-building service of a web server, which may in turn be invoked by a request from a client of the web server.

In some embodiments, the production environment may be implemented using resources of a provider network. The provider network may include numerous data centers hosting various services and resource pools of computing resources, such as collections of physical and/or virtualized computer servers, storage devices, networking equipment and the like, that are used to implement and distribute the infrastructure and services offered by the provider. Resources of the provider network may be hosted in "the cloud," and the provider network may be termed a cloud provider network. The provider network may offer some resource pools and services to multiple clients simultaneously and may thus be termed "multi-tenant." The computing resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). The provider network may offer a set of services whose functionality can be invoked by clients internal or external to the provider network. For example, the services may include "serverless" computing solutions that allocate and manage servers and hosts on behalf of clients, e.g., to execute client-specified functions. A number of different types of computing devices may be used singly or in combination to implement the resources of the provider network in different embodiments, including general purpose or special purpose computer servers, storage devices, network devices, and so on.

Figure 6:
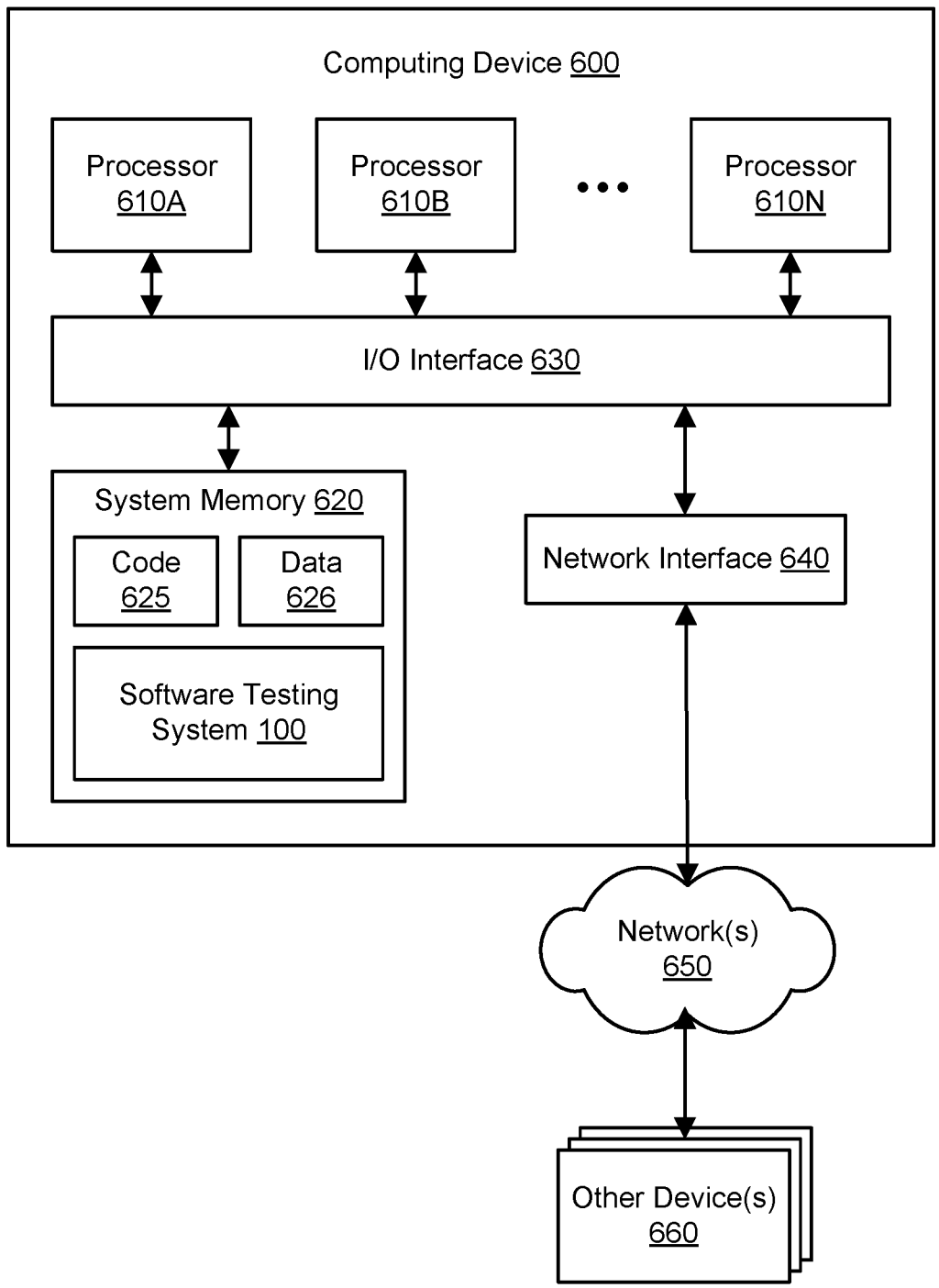
FIG. 6 illustrates an example computing device that may be used in some embodiments.

The software testing system 100 and production environment 195 may be implemented using any suitable number and configuration of computing devices, any of which may be implemented by the example computing device 600 illustrated in FIG. 6. The computing devices may be located in any suitable number of data centers or geographical locations. In various embodiments, at least some of the functionality of the software testing system 100 may be provided by the same computing device or by different computing devices. If any of the components of the software testing system 100 are implemented using different computing devices, then the components and their respective computing devices may be communicatively coupled, e.g., via one or more networks. Each of the components of the software testing system 100 may represent any combination of software and hardware usable to perform their respective functions. It is contemplated that software testing system 100 may include additional components not shown, fewer components than shown, or different combinations, configurations, or quantities of the components shown.

Operations implemented by the software testing system 100 may be performed automatically, e.g., without a need for user initiation or user intervention after an initial configuration stage, and programmatically, e.g., by execution of program instructions on at least one computing device without direct user intervention to collect and/or analyze runtime observations and generate persona-specific tests based (at least in part) on those observations. In one embodiment, aspects of the software testing system 100 may be performed continuously and/or repeatedly, e.g., to adapt to changing conditions in the production environment 195. For example, a dependency graph involving a particular set of services may be kept up to date based on the latest service call traces 135, e.g., by revising the dependency graph periodically. As another example, runtime observations for a particular service may be updated when the program code for the service is updated. In one embodiment, the software testing system 100 may be used in a deployment pipeline for new software (including new versions of software) such that personas are identified or updated based on the latest version of the program code.

Figure 2:
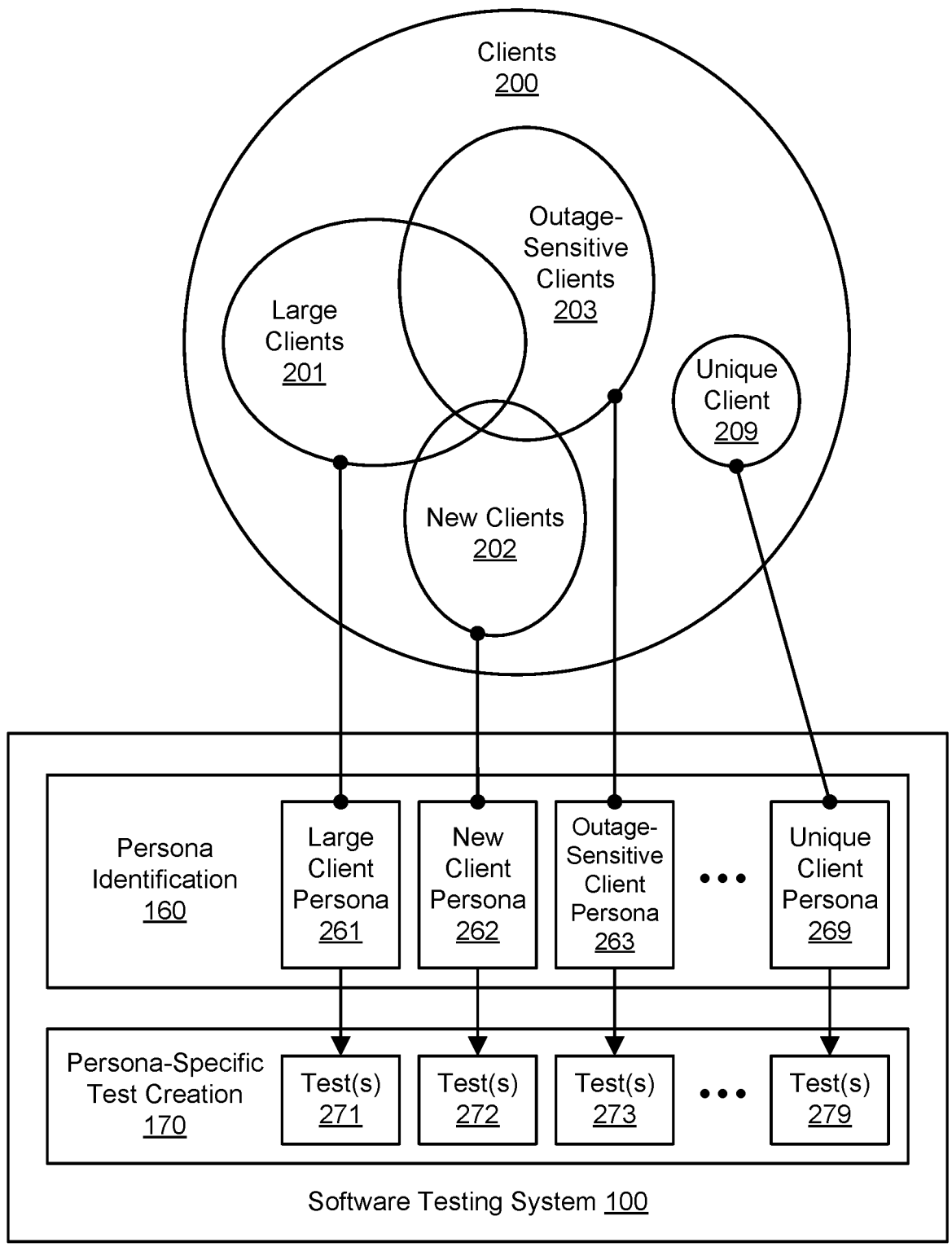
FIG. 2 illustrates further aspects of the example system environment for creation of software tests matching production personas, including an example mapping of production clients to production personas, according to some embodiments.

FIG. 2 illustrates further aspects of the example system environment for creation of software tests matching production personas, including an example mapping of production clients to production personas, according to some embodiments. As discussed above, the persona identification 160 may analyze the runtime observations (e.g., service logs 125, call traces 135, and/or metrics 145) to identify personas that correspond to distinct categories of client behavior. A particular persona may represent a set of usage characteristics that are observed in the runtime data for a particular subset of clients of a service. The usage characteristics may indicate that the subset of users associated with the persona use the service in a distinctive manner. For example, the usage characteristics that distinguish one persona from another persona may include a set of APIs that are called, a volume of calls over an interval of time, an order of calls, parameter values (inputs) of calls, outputs of calls, success or failure of calls, call patterns, how calls are connected (e.g., the result of one call is used as input to another call), service dependencies corresponding to calls, service metrics (e.g., latency) corresponding to calls, and so on.

A persona may represent at least one client but not all of the clients 200 of a given service. The clients associated with one persona may sometimes overlap with those of another persona. Personas may include manually identified personas and/or automatically identified personas (e.g., as determined using the component 160). In some embodiments, a persona may be assigned a user-friendly name to indicate one or more characteristics of the clients associated with the persona. The persona(s) identified for a service may be reported to a service owner or developer, e.g., using the user-friendly names and/or descriptions of the usage characteristics. Values in persona-specific tests may be automatically modified to protect confidential data, e.g., by replacing credit card numbers or home addresses in production data with valid but non-confidential values. Similarly, values in persona-specific tests may be processed as specified by service owners, e.g., to replace production values with non-production values.

In one embodiment, the personas identified among a set of clients 200 may include a large client persona 261 that corresponds to a set of large clients 201. In some embodiments, large clients 201 may be identified based (at least in part) on call volumes and/or usage of specific APIs and may represent clients that supply larger amounts of traffic to the service than others of the clients 200. The one or more tests 271 generated for the large client persona 261 may resemble or match the content of calls (e.g., APIs and parameter values) made by such clients 201 as well as the call patterns (e.g., call order and call throughput) of calls by such clients 201. The persona-specific tests 271 may be used to assess the functionality of a particular service or other software product with respect to the behavior of large clients 201.

In one embodiment, the personas identified among a set of clients 200 may include a new client persona 262 that corresponds to a set of new clients 202. In some embodiments, new clients 202 may be identified based (at least in part) on runtime observations (e.g., service logs 125) that indicate that the clients have begun using the service only recently or more recently than others of the clients 200, e.g., by calling an API associated with new usage of a service. The one or more tests 272 generated for the new client persona 262 may resemble or match the content of calls (e.g., APIs and parameter values) made by such clients 202 as well as the call patterns (e.g., call order and call throughput) of calls by such clients 202. The persona-specific tests 272 may be used to assess the functionality of a particular service or other software product with respect to the behavior of new clients 202.

In one embodiment, the personas identified among a set of clients 200 may include an outage-sensitive client persona 263 that corresponds to a set of clients 203 that are more susceptible or vulnerable to outages of a service. In some embodiments, outage-sensitive clients 203 may be identified based (at least in part) on runtime observations (e.g., service logs 125) that indicate that the clients use particular APIs at a greater rate than others of the clients 200. The one or more tests 273 generated for the outage-sensitive client persona 263 may resemble or match the content of calls (e.g., APIs and parameter values) made by such clients 203 as well as the call patterns (e.g., call order and call throughput) of calls by such clients 203. The persona-specific tests 273 may be used to assess the functionality of a particular service or other software product with respect to the behavior of outage-sensitive clients 203.

In one embodiment, the personas identified among a set of clients 200 may include a unique client persona 269 that corresponds to a single client 209 that uses the service in a particularly unusual or distinctive manner. In some embodiments, a unique client 209 may be identified based (at least in part) on runtime observations (e.g., service logs 125) that indicate that the client uses particular APIs, supplies parameter values, or has other call patterns that are not observed from others of the clients 200. The one or more tests 279 generated for the unique client persona 269 may resemble or match the content of calls (e.g., APIs and parameter values) made by such a client 209 as well as the call patterns (e.g., call order and call throughput) of calls by such a client 209. The persona-specific tests 279 may be used to assess the functionality of a particular service or other software product with respect to the behavior of the unique client 209. Similarly, the personas identified among a set of clients 200 may include a persona for clients that use a particular feature or API that others of the clients 200 do not.

Figure 3:
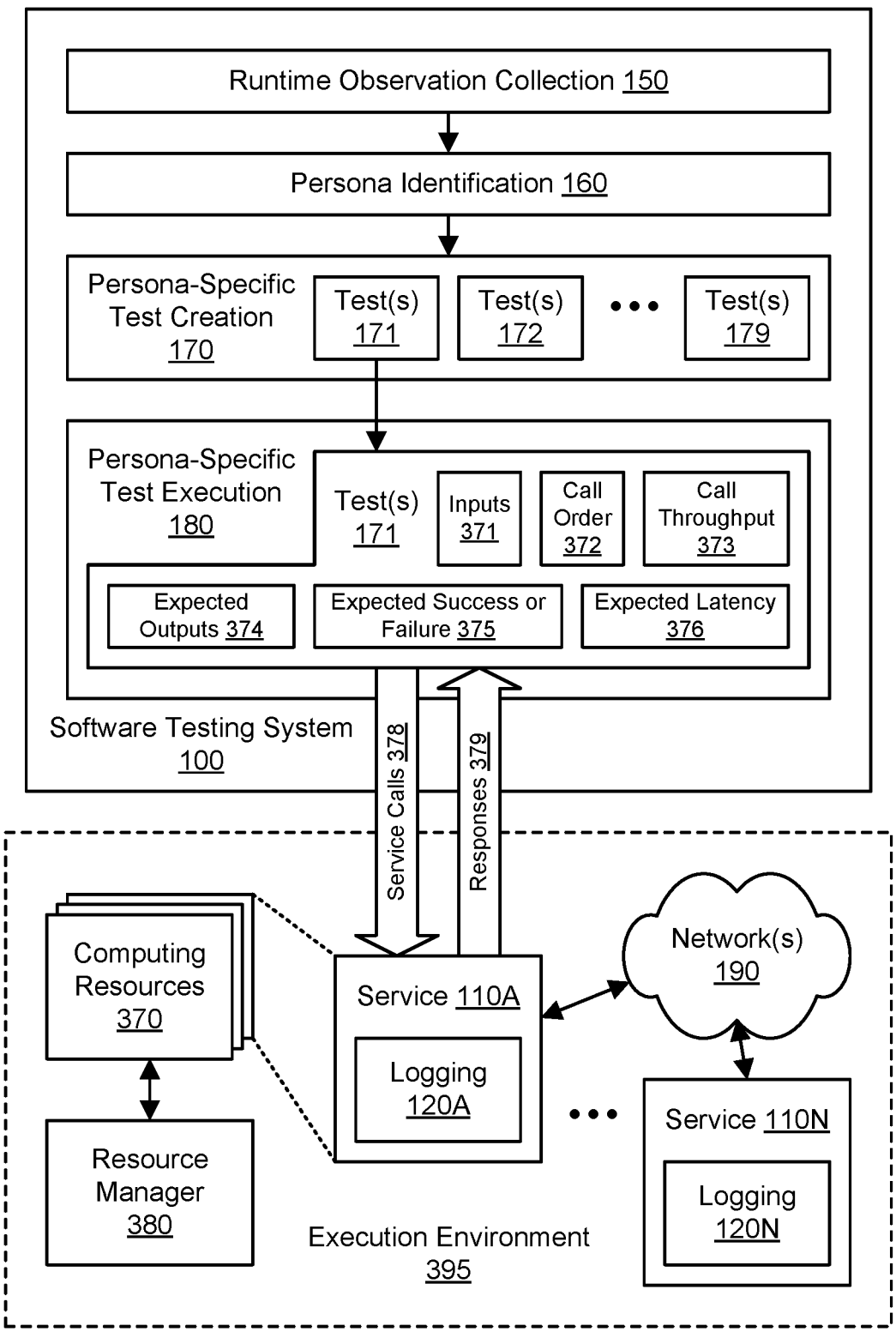
FIG. 3 illustrates further aspects of the example system environment for creation of software tests matching production personas, including automated testing using persona-specific tests, according to some embodiments.

FIG. 3 illustrates further aspects of the example system environment for creation of software tests matching production personas, including automated testing using persona-specific tests, according to some embodiments. The persona(s) identified for a service may be reported to a service owner or developer, e.g., using the user-friendly names and/or descriptions of the usage characteristics. In some embodiments, a service owner or developer may select (via user input) the one or more personas for which persona-specific tests should be created. In some embodiments, a service owner or developer may select (via user input) the one or more persona-specific tests that should be run against a service 110A. For example, as shown in FIG. 3, the one or more tests 171 corresponding to persona 161 may be selected for execution, e.g., according to user input from a developer or service owner. In some embodiments, persona-specific tests may be recommended to a user and then executed after approval by the user. In some embodiments, a user may give a blanket approval for one or more types of tests or for all recommended tests prior to the test creation 170.

The software testing system 100 may be used with a variety of different test configurations for persona-specific tests. For example, a persona-specific test may be performed once, e.g., as scheduled by a service owner or other entity responsible for testing. As another example, a persona-specific test may be performed automatically on a recurring basis, e.g., as indicated by a service owner or other entity responsible for testing. A persona-specific test may be performed automatically as part of a deployment pipeline. A persona-specific test may be performed using a particular execution environment 395, e.g., an environment that replicates some aspects of the production environment 195.

The software testing system 100 may be used to generate and/or initiate a variety of different test types for persona-specific tests. In some embodiments, persona-specific tests may include integration tests, regression tests, system tests, end-to-end tests, load tests, performance tests, canary tests, and so on. Persona-specific tests may generally include sending one more client requests to a service 110A under test, where the requests seek to invoke the functionality provided by the service. Tests may be monitored (e.g., by the system 100) to detect errors, flaws, unexpected results, performance not meeting service-level agreements (SLAs), and/or other problems surfaced by the testing.

An integration test may include testing a service 110A in combination with other services (e.g., service 110N), resources, and components. A regression test may be used to verify that a change to the program code of the service 110A has not adversely affected existing functionality. A system test may include testing a service 110A to assess the coordination of a set of components. An end-to-end test may test an application flow through a service 110A along with its dependencies. A load test may include testing a service 110A with a high volume of calls to assess the ability of the service to withstand high throughput. A performance test may test the performance of aspects of the service, e.g., request processing latency, processor utilization at service hosts, memory utilization at service hosts, and so on.

Canary tests may represent a "canary in a coal mine" intended to quickly detect flaws, errors, or other problems with a service 110A before such problems cause a widespread outage or disruption. Canary tests may represent tests to verify a minimum of functionality of a software product. For example, if a service 110A stores objects using cloud-hosted storage, then canary testing may send requests for object storage to the service. Canary tests may check frequent sources of problems, e.g., network connectivity issues, database and middleware availability, disk quota issues, access credentials, software versioning, data integrity and consistency, license expiration, and so on. In some embodiments, canary testing may be performed automatically and repeatedly after an initial configuration phase. For example, each test client may be configured to perform a canary test (e.g., by sending one or more requests to the service 110A) every ten seconds.

Using a component 180 for persona-specific test execution, the service 110A may be subjected to automated testing using the persona-specific test(s) 171 in an execution environment 395. The execution environment 395 may represent a test environment, a development environment, a pre-production environment, or a production environment. The execution environment 395 may represent a different environment than the production environment 195 from which the runtime observations were collected. In one embodiment, the tests may be executed in a test environment in which the software product may be insulated from real-time interaction with real-world clients, e.g., by processing only synthetic requests or prerecorded client requests that were previously captured in a production environment.

The execution environment 395 may include various modules, components, or functionalities to implement testing of software product according to tests in a test suite. The execution environment 395 may be used to test a software product at build time, deployment time, or any other suitable time in the development cycle. The execution environment 395 may be part of a testing framework that is available to developers of various types of software product. The persona-specific test execution 180 may be implemented as a service whose functionality can be invoked by clients (including end users and/or other services) via a programmatic interface or user interface. In one embodiment, aspects of the persona-specific test execution 180 may be activated as part of a deployment pipeline for deploying a software product to a production environment. In one embodiment, aspects of the persona-specific test execution 180 may be part of or invoked by a continuous integration system or continuous deployment system. For example, program code for the software product may be stored by a managed source-control service that hosts repositories. Using an automated pipeline management service, the program code may be built, tested, and deployed for every code change or according to other triggers. The tests and/or deployment to production may be performed automatically as part of such a pipeline.

Automated testing 180 using persona-specific tests 171 may include distributed testing. Distributed testing may use a fleet of test clients to mimic customer behavior with respect to a service, application, application programming interface (API), or other software product at an endpoint. Test clients may include servers or hosts, containers, and/or instances of a serverless compute service that are used for initiating or performing automated testing of a service 110A. In applying the test(s) 171 for a given persona 161, individual test clients may send service calls (service requests) 378 to the service 110A being tested with particular parameter values (inputs) 371 associated with that persona 161. In some embodiments, the test clients may send requests 378 according to a call order 372 associated with the persona 161. In some embodiments, the test clients may send requests 378 to meet a call throughput 373 or rate associated with the persona 161. Aspects of the distributed testing may be managed by a centralized component such as the software testing system 100. For example, the software testing system 100 may set testing schedules for individual test clients, monitor the results of tests, and/or raise alarms when tests detect problems with the service 110A.

The service calls 378 may mimic the behavior of real-world customers of the service 110A deployed to the endpoint. For example, if the service 110A dynamically generates components of web pages associated with an online store, then the test execution 180 may provide requests 378 for such web page components. Via the responses 379 of the service 110A to the calls 378, the test execution may be monitored, e.g., using the test execution component 180. The test monitoring may seek to detect errors, flaws, unexpected results, performance not meeting service-level agreements (SLAs), and/or other problems surfaced by the testing. For example, if requests 378 generated by the test execution 180 tend to produce errors at the service endpoint, then the test execution component 180 may detect such errors via responses 379 from the endpoint (or from the lack of such responses within a predetermined time threshold). The persona-specific test(s) 171 may include a set of expected output values 374 corresponding to particular input values, an expected success or failure 375 of particular input values, an expected latency 376 for one or more calls, and/or other values with which to assess the performance of the service 110A during testing. The test monitoring may assess whether such expected values are met, e.g., using the responses 379 to the service calls 378. The responses 379 may indicate outputs generated for specific input values, failure of success of requests, latency of request processing, and/or other indicia of erroneous or poor performance by the service 110A. In some embodiments, service logs captured by the logging components 120A and/or 120N may also be used to assess service performance associated with the persona-specific testing 180.

The system 100 may take one or more actions based (at least in part) on the test execution 180 and monitoring. For example, the system 100 may raise one or more alarms or generate reports. Alarms or reports may indicate particular problems that were detected by the automated software testing. For example, alarms or reports may indicate the particular API for which a problem was found, the time at which the problem was found, the nature of the problem, and so on. Alarms may be raised in a management console associated with the tested endpoint or send to relevant developers or owners of the service. A report may be stored to a storage location, sent to a relevant user (e.g., a developer of the service 110A), and/or displayed in a user interface accessible by a developer of the program code.

In some embodiments, the software testing system 100 and/or services 110A-110N may be implemented using resources of a provider network. In one embodiment, the provider network may include numerous data centers hosting various resource pools, such as collections of physical and/or virtualized computer servers, storage devices, and networking equipment that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. In one embodiment, an operator of the provider network may implement a flexible set of resource reservation, control, and access interfaces for clients. For example, a provider network may implement a programmatic resource reservation interface (e.g., via a web site or a set of web pages) that allows clients to learn about, select, purchase access to, and/or reserve resources. The provider network may be hosted in the cloud and may be termed a cloud provider network. The provider network may offer multi-tenancy using its various resources pools and may be termed a multi-tenant provider network.

In some embodiments, components of the execution environment 395 may be provisioned and configured in order to run persona-specific test(s) 171 to accurately resemble the production environment 195. A resource manager 380 of a multi-tenant provider network may manage access to a set of computing resources 370. The computing resource 370 may include, for example, various pools of compute instances as discussed above. To perform the test execution 180, the software testing system 100 may interact with the resource manager 380 to provision and reserve one or more of the computing resources 370 for use by the service 110A during the testing. The execution environment 395 may be configured to resemble some aspects of the production environment 195, e.g., with the number and configuration of computing resources, the same version of the service 110A, and so on. After the testing is complete, the resource manager 380 may deprovision the one or more computing resources and return them to the pool(s) 370 of available resources for later use by other clients. By provisioning a testing-focused stack that mimics aspects of the production environment 195, the persona-specific testing 180 may mitigate a performance impact on other stages of a continuous deployment pipeline.

In some embodiments, at least some of the persona-specific tests 171 may be performed in parallel in order to minimize testing time. In some embodiments, the persona-specific tests 171 may be performed in a specific order. The degree of parallelism and/or specific order may be determined based (at least in part) on historical data, e.g., as captured using prior tests. For example, individual persona-specific tests may be analyzed to estimate the likelihood that the test will fail. The likelihood of failure may be based on a variety of weighted factors such as the failure history of individual tests. The tests may be placed in an ordered sequence based (at least in part) on the estimated likelihood of failure for the individual tests. When the testing process is initiated using the ordered sequence, tests with a higher estimated likelihood of failure may be performed earlier than those with a lower estimated likelihood of failure. When one or more failures are encountered during the testing process, the testing may be stopped before all the tests have been performed, and/or a user may be notified of the failure(s). In this manner, feedback about test failure may be delivered earlier in the testing process so that developers may use their time more efficiently and so that computing resources associated with testing are conserved.

Figure 4:
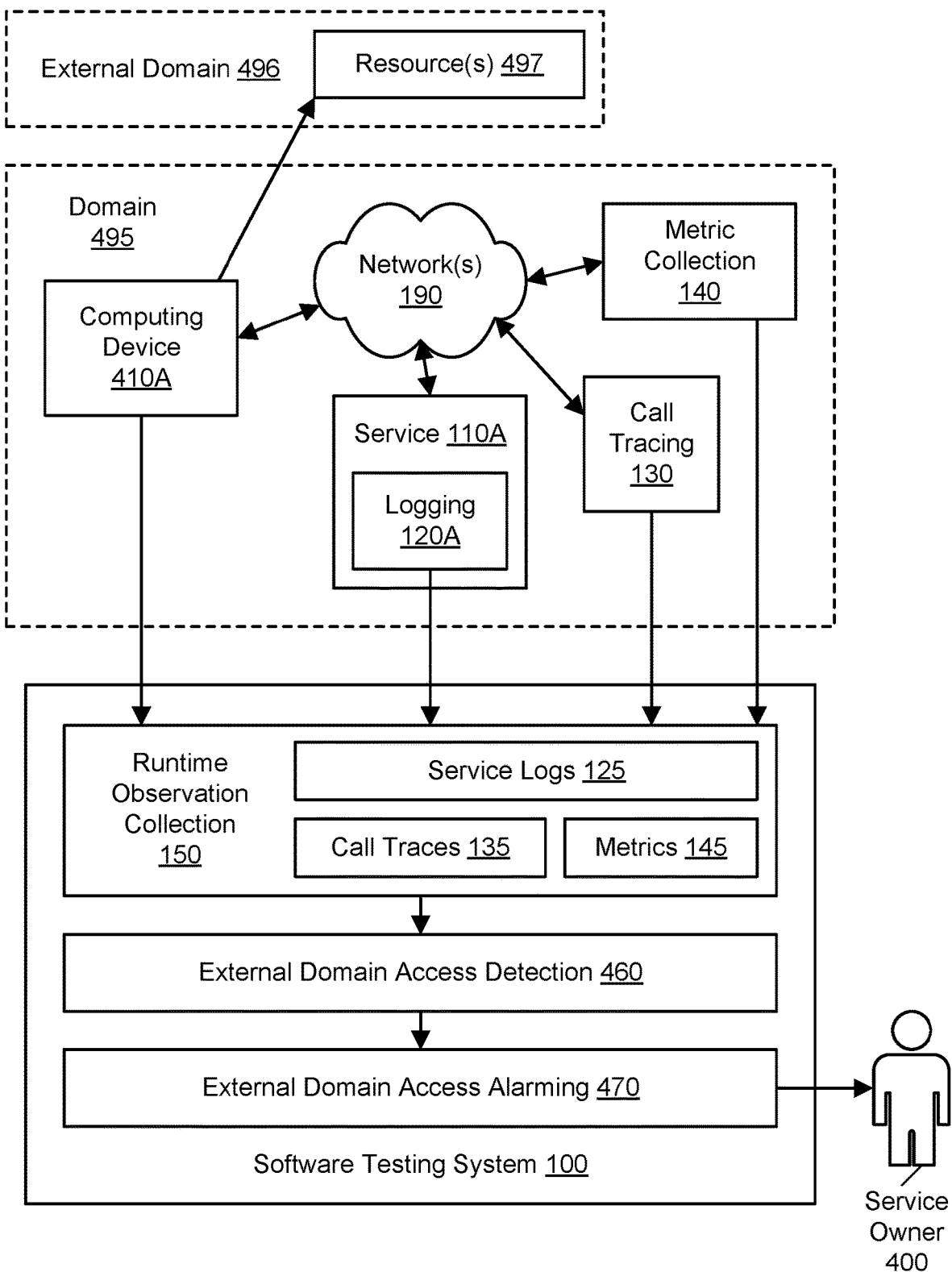
FIG. 4 illustrates further aspects of the example system environment for creation of software tests matching production personas, including detection of and alerting on external domain access, according to some embodiments.

FIG. 4 illustrates further aspects of the example system environment for creation of software tests matching production personas, including detection of and alerting on external domain access, according to some embodiments. In some embodiments, the software testing system 100 may include a component 460 for external domain access detection. The external domain access detection 460 may analyze the runtime observations (e.g., the service logs 125 and/or call traces 135) to detect when a computing device or other component 410A within a particular network or domain 495 has accessed (or attempted to access) one or more resources 497 in another (external) network or domain 496. The computing device 410A may represent a service endpoint being tested or a component associated with testing a service, e.g., a test client or other computing device operated by a service owner. The network or domain 495 may represent a testing environment or a production environment. Similarly, the external domain access detection 460 may also be used to identify accesses by a computing device 410A to particular endpoints within the same domain 495. The external domain access detection 460 may be used to identify access attempts that could potentially resemble distributed denial of service attacks or other forms of malicious behavior. For example, an excessive number of access attempts by the computing device 410A to the resource(s) 497 may bring down the resources and/or result in a denial of service to other clients.

In some embodiments, the software testing system 100 may include a component 470 for external domain access alarming. The external domain access alarming 470 may notify a service owner 400 (or other appropriate user) when the computing device 410A has accessed (or attempted to access) the external domain 496. An alert generated by the external domain access alarming 470 may indicate or describe the computing device 410A, the external domain 496, the resource(s) 497, the timing of the one or more access attempts, the number of access attempts, and so on. In some embodiments, such alerts may be generated only if the number of access attempts over some interval of time exceeds a threshold value.

Figure 5:
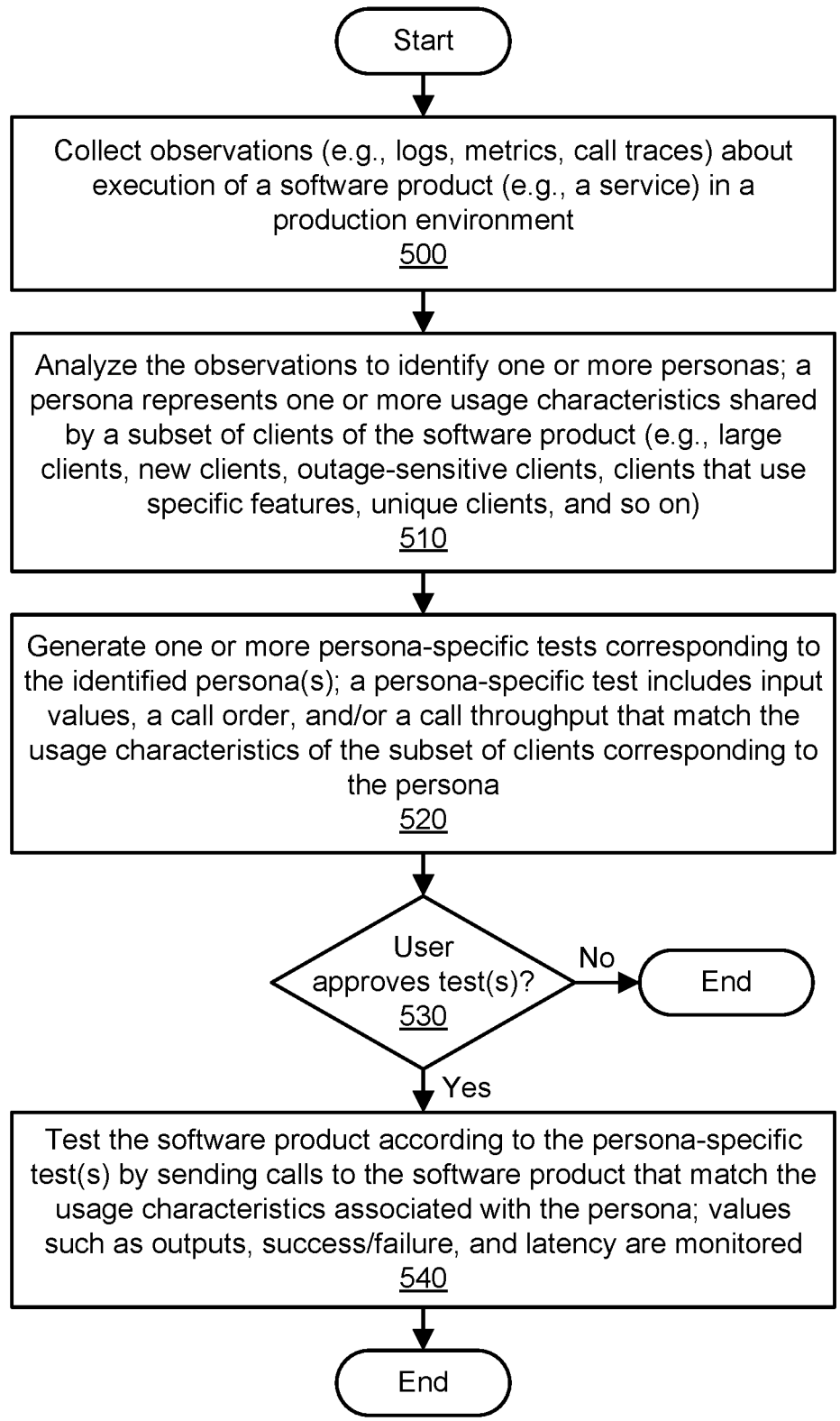
FIG. 5 is a flowchart illustrating a method for creation of software tests matching production personas, according to some embodiments.

FIG. 5 is a flowchart illustrating a method for creation of software tests matching production personas, according to some embodiments. As shown in 500, the method (via a software testing system) may collect observations about the execution of a software product (e.g., a service or application) in a production environment. For example, the runtime observations may include service logs that indicate application programming interfaces (APIs) that were invoked by service calls, parameter values (inputs) of calls, responses (outputs) to calls, timestamps of calls, and so on. As another example, the runtime observations may include call traces acquired from a call tracing component. To perform call tracing, trace headers may be embedded in service requests, and the flow of a particular trace header from service to service may be used to identify call chains and dependency relationships among services. As yet another example, the runtime observations may include metrics indicating performance values (e.g., average values over intervals of time or threshold violations) observed for processor resources, memory resources, storage resources, network resources, and so on. Runtime observations may be collected once or on a recurring basis, e.g., according to a schedule or frequency specified by service owners. The runtime observations may be collected over a sufficiently long interval of time to identify representative behaviors of clients.

As shown in 510, the method (via the software testing system) may analyze the observations to identify one or more personas. A particular persona may represent a set of usage characteristics or behaviors that are observed in the runtime data for a subset of clients of a service. A subset of clients may include at least one client but not all of the clients. In some embodiments, for example, personas identified in the production environment may include a large client persona, a new client persona, an outage-sensitive client persona, a persona for a client that uses a particular feature, a unique or unusual client persona, and so on. The usage characteristics or behaviors that distinguish one persona from another persona may include a set of APIs that are called, a volume of calls, an order of calls, parameter values (inputs) of calls, outputs of calls, call patterns, how calls are connected, service dependencies corresponding to calls, service metrics corresponding to calls, and so on.

As shown in 520, the method (via the software testing system) may generate one or more persona-specific tests corresponding to one or more of the identified personas. For a given persona, the persona-specific test creation may generate one or more tests that seek to match the usage characteristics or the real-world behavior of that persona's subset of clients with respect to the service. A persona-specific test may include a set of input values, a call order, a call volume or call throughput, and so on. Input values in persona-specific tests may be cleaned up by the software testing system, e.g., to replace confidential values observed in production traffic with valid and non-confidential values.

The software testing system may present the identified personas and/or the persona-specific test(s) to one or more service owners or developers associated with the software product. In some embodiments, the software testing system may solicit user input representing approval or selection of the test(s). As shown in 530, the method (via the software testing system) may determine whether the user has approved the execution of the persona-specific test(s). In some embodiments, the approval may be received prior to the operation shown in 520, e.g., as a blanket approval to perform any recommended tests, and the tests may be performed automatically based (at least in part) on the pre-approval. In some embodiments, a suite of persona-specific tests may be selected automatically to meet one or more user-specified values such as a time limit for the testing or a maximum number of tests. If no tests are approved, the method may end.

If one or more tests are approved, then as shown in 540, the method (via the software testing system) may test the software product according to the selected persona-specific test(s). Testing may include sending calls to the software product that match the usage characteristics or the real-world behavior of the corresponding persona. The calls may reflect the input parameter values, call order, and throughput of the persona. The persona-specific test(s) may be associated with a set of expected output values corresponding to particular input values, an expected success or failure of particular input values, an expected latency for one or more calls, and/or other values with which to assess the performance of the service during testing. Test monitoring may be performed to assess whether such expected values are met, e.g., using the responses to the service calls and/or service logs.

Illustrative Computer System

In at least some embodiments, a computer system that implements a portion or all of one or more of the technologies described herein may include a computer system that includes or is configured to access one or more computer-readable media. FIG. 6 illustrates such a computing device 600. In the illustrated embodiment, computing device 600 includes one or more processors 610A-610N coupled to a system memory 620 via an input/output (I/O) interface 630. Computing device 600 further includes a network interface 640 coupled to I/O interface 630.

In various embodiments, computing device 600 may be a uniprocessor system including one processor or a multiprocessor system including several processors 610A-610N (e.g., two, four, eight, or another suitable number). Processors 610A-610N may include any suitable processors capable of executing instructions. For example, in various embodiments, processors 610A-610N may be processors implementing any of a variety of instruction set architectures (ISAs), such as the x86, PowerPC, SPARC, or MIPS ISAs, or any other suitable ISA. In multiprocessor systems, each of processors 610A-610N may commonly, but not necessarily, implement the same ISA.

System memory 620 may be configured to store program instructions and data accessible by processor(s) 610A-610N. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 620 as code (i.e., program instructions) 625 and data 626. In the illustrated embodiment, system memory 620 also stores program code and data that implement aspects of the software testing system 100 discussed above.

In one embodiment, I/O interface 630 may be configured to coordinate I/O traffic between processors 610A-610N, system memory 620, and any peripheral devices in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processors 610A-610N). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processors 610A-610N.

Network interface 640 may be configured to allow data to be exchanged between computing device 600 and other devices 660 attached to a network or networks 650. In various embodiments, network interface 640 may support communication via any suitable wired or wireless general data networks, such as types of Ethernet network, for example. Additionally, network interface 640 may support communication via telecommunications/telephony networks such as analog voice networks or digital fiber communications networks, via storage area networks such as Fibre Channel SANs, or via any other suitable type of network and/or protocol.

In some embodiments, system memory 620 may be one embodiment of a computer-readable (i.e., computer-accessible) medium configured to store program instructions and data as described above for implementing embodiments of the corresponding methods and apparatus. For example, system memory 620 may store program code and data associated with the system 100. In some embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 600 via I/O interface 630. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 600 as system memory 620 or another type of memory. Further, a computer-readable medium may include transmission media or signals such as electrical, electromagnetic, or digital signals, conveyed via a communication medium such as a network and/or a wireless link, such as may be implemented via network interface 640. Portions or all of multiple computing devices such as that illustrated in FIG. 6 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a software testing system comprising one or more processors and one or more memories to store computer-executable instructions that, when executed, cause the one or more processors to:
collect a plurality of observations about execution of a service in a production environment comprising a plurality of services, wherein the plurality of observations comprise one or more service logs;
identify a plurality of personas based at least in part on the plurality of observations, wherein a particular one of the personas represents a particular set of one or more usage characteristics shared by a particular subset of clients of the service, wherein the particular subset of clients is less than all clients of the service, wherein a different persona of the personas represents a different set of one or more usage characteristics shared by a different subset of the clients;
generate one or more tests associated with the particular persona, wherein the one or more tests comprise one or more input values of service calls, and wherein the one or more input values represent the particular set of usage characteristics shared by the particular subset of clients of the service; and
test the service using the one or more tests, wherein in testing the service, the software testing system sends a plurality of service calls comprising the one or more input values to one or more endpoints hosting the service.

2. The system as recited in claim 1, wherein the one or more memories store additional computer-executable instructions that, when executed, cause the one or more processors to:
determine one or more test patterns comprising a call order and a call volume, wherein the plurality of service calls are sent to the to one or more endpoints hosting the service according to the one or more test patterns.

3. The system as recited in claim 1, wherein the one or more memories store additional computer-executable instructions that, when executed, cause the one or more processors to:
monitor one or more output values generated for particular input values in the one or more tests; and
determine whether the one or more output values match one or more expected output values associated with the one or more tests.

4. The system as recited in claim 1, wherein the one or more memories store additional computer-executable instructions that, when executed, cause the one or more processors to:
provision one or more computing resources from one or more pools of computing resources hosted by a multi-tenant provider network, wherein the service is deployed to the one or more computing resources and tested using the one or more computing resources, and where deployment of the service to the one or more computing resources replicates one or more attributes of the service in the production environment; and
deprovision the one or more computing resources after testing the service.

5. A method, comprising:
determining, by a software testing system, a plurality of observations regarding execution of a software product in a production environment comprising a plurality of software products;
determining, by the software testing system, a plurality of personas based at least in part on analysis of the plurality of observations, wherein:
a particular persona of the personas represents a set of one or more usage characteristics shared by a particular subset of clients, wherein the particular subset is less than all clients of the software product, and
a different persona of the personas represents a different set of one or more usage characteristics shared by a different subset of the clients; and
generating, by the software testing system, one or more tests associated with the particular persona, wherein the one or more tests comprise one or more input values of a plurality of calls, and wherein the one or more input values represent the usage characteristics shared by the particular subset of clients of the software product.

6. The method as recited in claim 5, wherein the plurality of observations comprise one or more logs indicating inputs to the software product and outputs of the software product.

7. The method as recited in claim 5, wherein the plurality of observations comprise one or more metrics indicating a performance of the software product.

8. The method as recited in claim 5, wherein the plurality of observations comprise one or more call traces indicating interactions between individual ones of the plurality of software products.

9. The method as recited in claim 5, wherein the particular persona represents a large client persona, and wherein the one or more usage characteristics comprise a higher volume of calls to the software product by the subset of clients than by one or more other clients.

10. The method as recited in claim 5, wherein the particular persona represents a new client persona, and wherein the one or more usage characteristics comprise a newer usage of the software product by the subset of clients than by one or more other clients.

11. The method as recited in claim 5, wherein the particular persona represents an outage-sensitive client persona, and wherein the one or more usage characteristics comprise a greater vulnerability to an outage of the software product by the subset of clients than by one or more other clients.

12. The method as recited in claim 5, further comprising:
testing the software product using the one or more tests, comprising sending, by the software testing system, a plurality of calls comprising the one or more input values to one or more endpoints hosting the software product.

13. The method as recited in claim 12, further comprising:
determining, by the software testing system, a call order and a call volume associated with the one or more tests, wherein the plurality of calls are sent according to the call order and the call volume.

14. The method as recited in claim 5, wherein generating the one or more tests comprises replacing confidential input values observed in the production environment with valid non-confidential input values in the one or more tests.

15. One or more non-transitory computer-readable storage media storing program instructions that, when executed on or across one or more processors, perform:
determining a plurality of observations associated with execution of a service in a production environment comprising a plurality of services;
determining one or more a plurality of personas based at least in part on automated analysis of the plurality of observations, wherein a particular persona of the personas represents a set of one or more usage characteristics shared by a particular portion of clients of the service, wherein the particular subset is less than all clients of the service and a different persona of the personas represents a different set of one or more usage characteristics shared by a different subset of the clients;
generating one or more tests associated with the particular persona, wherein the one or more tests comprise one or more input values of a plurality of service calls, and wherein the one or more input values represent the usage characteristics shared by the particular portion of clients of the service; and
testing the service using the one or more tests, comprising sending a plurality of service calls comprising the one or more input values to one or more endpoints hosting the service.

16. The one or more non-transitory computer-readable storage media as recited in claim 15, further comprising additional program instructions that, when executed on or across the one or more processors, perform:
determining one or more test patterns comprising a call order and a call volume, wherein the plurality of service calls are sent to the one or more endpoints hosting the service according to the one or more test patterns.

17. The one or more non-transitory computer-readable storage media as recited in claim 15, wherein the one or more tests represent one or more integration tests.

18. The one or more non-transitory computer-readable storage media as recited in claim 15, wherein the one or more tests are performed in a particular order, and wherein the particular order is determined based at least in part on one or more earlier tests.

19. The one or more non-transitory computer-readable storage media as recited in claim 15, further comprising additional program instructions that, when executed on or across the one or more processors, perform:
determining that one or more calls are made to one or more endpoints external to a network or domain in which the service is hosted; and
generating an alarm responsive to the one or more calls to the one or more endpoints.

20. The one or more non-transitory computer-readable storage media as recited in claim 15, further comprising additional program instructions that, when executed on or across the one or more processors, perform:
provisioning one or more computing resources from one or more pools of computing resources hosted by a multi-tenant provider network, wherein the service is deployed to the one or more computing resources and tested using the one or more computing resources, and where deployment of the service to the one or more computing resources replicates one or more attributes of the service in the production environment; and
deprovisioning the one or more computing resources after testing the service.

* * * * *